United States Patent [19]

Picek

[11] Patent Number: 5,015,376

[45] Date of Patent: May 14, 1991

[54] SEMI-RIGID ENHANCED AREA FILTER ELEMENT

[76] Inventor: Charles R. Picek, 10322 Malcolm Cir., Cockeysville, Md. 21030

[21] Appl. No.: 468,101

[22] Filed: Jan. 22, 1990

[51] Int. Cl.$^5$ .................. B01D 29/17; B01D 29/27
[52] U.S. Cl. .................... 210/317; 210/321.86; 210/321.87; 210/445; 210/452; 210/489; 210/493.2; 210/493.5; 210/497.2; 55/381; 55/498; 55/521
[58] Field of Search ............. 210/445, 448, 452, 232, 210/314, 315, 317, 321.77, 321.86, 484, 485, 486, 487, 489, 492, 493.1, 493.4, 493.5, 497.01, 497.2, 498, 500.21, 321.87, 493.2; 55/381, 498, 521

[56] References Cited

U.S. PATENT DOCUMENTS

| | | | |
|---|---|---|---|
| 2,826,308 | 3/1958 | Koupal | 210/452 |
| 3,631,987 | 1/1972 | Cattano, Sr. | 210/452 |
| 3,640,392 | 2/1972 | Smith et al. | 210/452 |
| 4,157,964 | 6/1979 | Rishel | 210/452 |
| 4,388,191 | 6/1983 | Morgan | 210/452 |
| 4,390,425 | 6/1983 | Tafara et al. | 210/452 |
| 4,664,798 | 5/1987 | Bergh | 210/452 |

Primary Examiner—Robert A. Dawson
Assistant Examiner—Wanda L. Millard

[57] ABSTRACT

This invention is directed to a novel semi-rigid enhanced area filter element that can be installed and used with new or existing bag-type filter housings. The invention specifically refers to the pleated and padded element (5) fitted closely within a retaining basket (4) inside of a bag-type pressure filter housing (1) to provide preferred inside-out flow passage from inlet (2) to outlet (3) but with greatly enhanced surface area, padded serialized inner filtration, extended filter life and increased particulate removal efficiencies. The element (5) is composed of a pleated and padded stack (18) bonded to a resilient flanged upper open end cap (8) and a solid bottom end cap (9). The element is economical to manufacture, can utilize many of the single and multilayer filter membranes and impregnated membranes presently on the market, and is free of complicated parts and mechanisms. The element can also be efficiently used as an adsorbent and/or coalescent cartridge for complete versatility of fluid filtration or separation purposes.

3 Claims, 3 Drawing Sheets

SEMI-RIGID ENHANCED AREA FILTER ELEMENT

DISCLOSURE OF INVENTION

The subject invention provides for a semi-rigid, enhanced area, unitized filter element, and, that such an element is economical to manufacture, is easy to install and use with new and or existing bag-type filter housings, is broadly adaptable to single and or multi-layered filter membranes presently on the market, and, is free from complicated parts and mechanisms. A prime example of the filter element as described in this specification, is with an inside-out flow path through multiple inside layers of padded filtering membranes alternately separated by layers of drainage media, through one or more integral final membranes, and, with all layers, pleated vertically and held together with flexible outer, bottom, and top-edged encasements. This semi-rigid element is designed to be fit snugly into a typical bag-style basket retainer which provides the outer strength of the assembly and precludes the necessity of expensive inner and outer cores and highly reinforced bottom and top end caps as in conventional pleated rigid elements. Furthermore the novel configuration of this element readily lends itself to fabrication from any of the single and/or multiple layer membranes and the many impregnated adsorbent membranes for complete versatility of fluid filtration purposes.

BACKGROUND OF INVENTION

Classically bag filtration devices consist of a housing, fluid inlet and outlet connections, an internally supported basket, a loosely fitting cylindrical cloth bag with a closed bottom and rigid ring-like upper rim, and, a hinged and bolted cover plate to retain the rim of the bag and to seal the pressure housing. Fluid under pressure is introduced into the vessel, allowed to pass through the bag in an inside-out mode, and, then exit through an isolated outlet port. Suspended solids in the incoming fluid that are of larger size than the openings of the filter bag are trapped inside the bag. As the solids plug the inner surface of the filter bag, the differential pressure across the bag will rise, and, when the maximum allowable pressure is reached, the filter system is shut down, the vessel vented and/or drained, the cover removed, the expanded bag removed, and, a new bag is reinstalled. Obviously the life of any particular bag depends upon the integrity of the bag seams, closures and seals, and, more importantly, the surface area of the bag itself.

Many innovations have been developed in an attempt to improve the bag insertion and the sealing of the top edge ring of the bag itself. Many innovations have been proposed to provide fluted or cogged surfaces within or around the bag retention mechanisms to allow the bag material to deform and thereby provide a modest increase in filtering surface area. Many or all work to some extent but they have not been universally accepted due to initial high costs, only modest increases in surface area, difficulty in manufacture, high maintenance costs, difficulty in assembly, and requirements for specially designed multiple parts and components. Secondly, there are presently many rigid pleated cartridges employed in pressure vessel filtering housings. These cartridges are usually integral units with rigid inner cores, pleated and encapsulated membrane packs, netted outer cages, rigid end caps, and, typically outside-in flow. The entire cartridge must be designed to withstand full differential pressures, and thereby, normally limited to modest diameters and lengths, and obviously, limited surface areas. Furthermore, to fabricate that type of rigid pleated cartridge for large diameters and/or for inside-out flows, additional and excessive reinforcement, is required, and thereby, precludes the manufacture of economical disposable cartridge element.

Furthermore, pleated and/or cylindrical elements, as presently available, are limited by the surface area of the pleated or cylindrical surfaces of the final filtering membrance. Even with progressive and/or progressive depth filtraton, the overall life of such elements is restricted by the surface area of the final filtering membrane since, in those configurations, much of the fine particulate in the fluid being filtered is allowed to progress all the way through the coarser filter media and lodge against the final finite filter membrane surface.

Therefore to retain the basic advantageous characteristics of bag filtration but to overcome the above mentioned deficiencies of said bag and rigid element filters, this invention addresses a novel filtering element that provides semi-rigid, one-piece inexpensive construction, greatly enhanced filtering area, and internal dirt retention, and that it can be readily adapted to existing bag filter housings or incorporated directly into newly designed or existing pressure filtering vessels for complete versatility of filtration purposes.

BRIEF SUMMARY OF INVENTION

The subject invention covers a novel semi-rigid, snugly fitting enhanced area, unitized element for fluid filtration. This element is designed to be installed into typical bag-style retaining baskets that furnish the outer strength of the assembly. However, this element does provide several fold increases in final filtering surface areas due to its unique pleated format combined with the use of padded layers of inner filtering membranes. The padded layers also remove a large presentage of the particulate (including the finest sized particles) and thereby reduce the challenge on the final finite filter membrane layer. This element also retains the inside-out flow pattern and the ease of operation and versatility of conventional bag filter. This element can be readily fabricated from a much larger variety of single or multi-layered membranes and many impregnated absorbant membranes for complete versatility of filtration purposes. Specifically this semi-rigid element can be adapted to existing bag filter housings with simple modified basket retainers or incorporated directly in newly designed pressure vessels to obtain significant improvements in filter life as compared to bag or rigid filters within the same envelope. The element can also be efficiently used as an absorbent and/or coalescent cartridge with or without the inner core being filled with resins, desicants, charcoal, diatomaceous earth and other material.

DETAILED DESCRIPTION OF PREFERRED EMBODIMENTS

Figure 1:
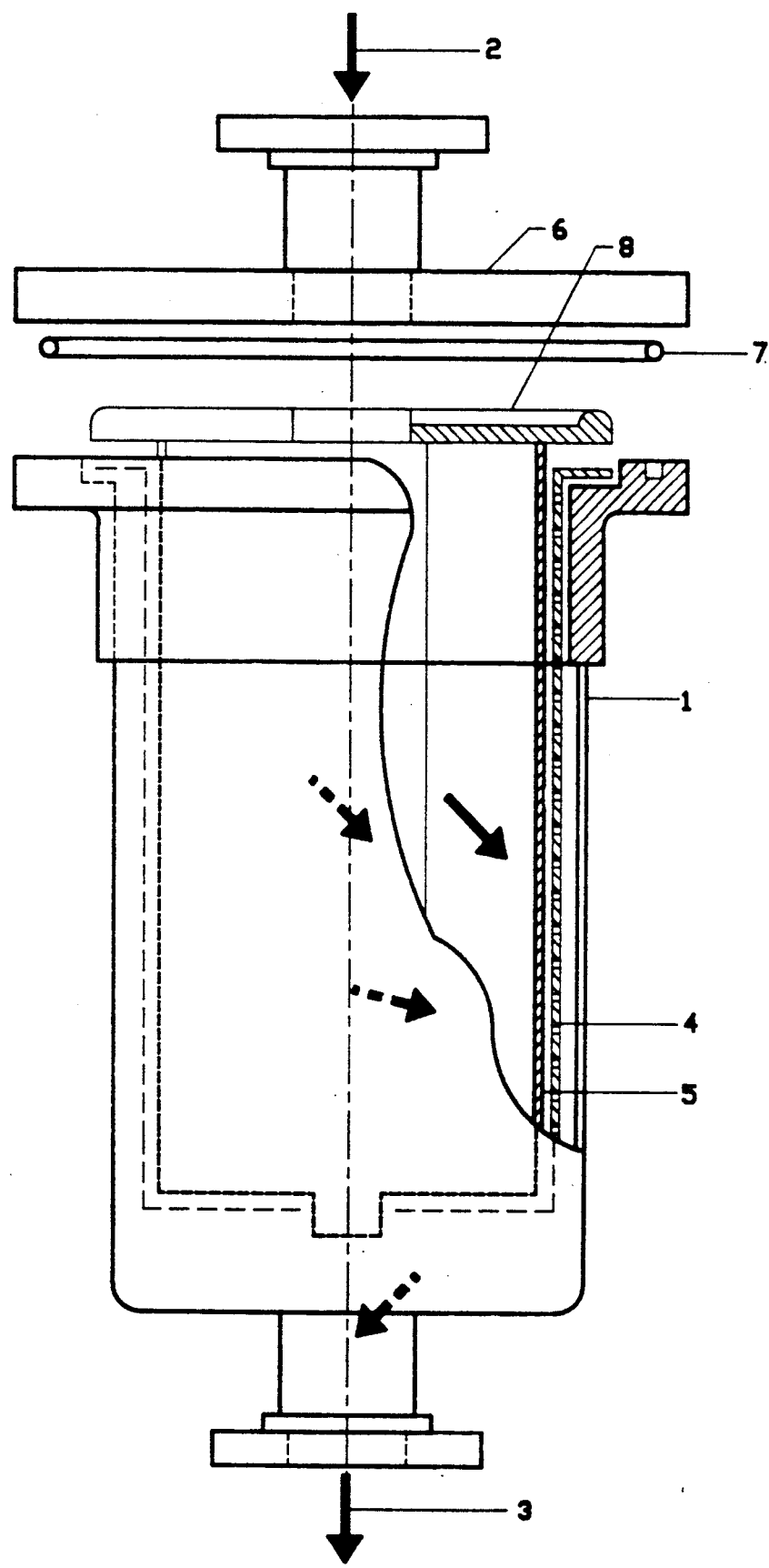
FIG. 1: A vertical section of the semi-rigid enhanced area filter element installed in a typical basket retainer.
Figure 2:
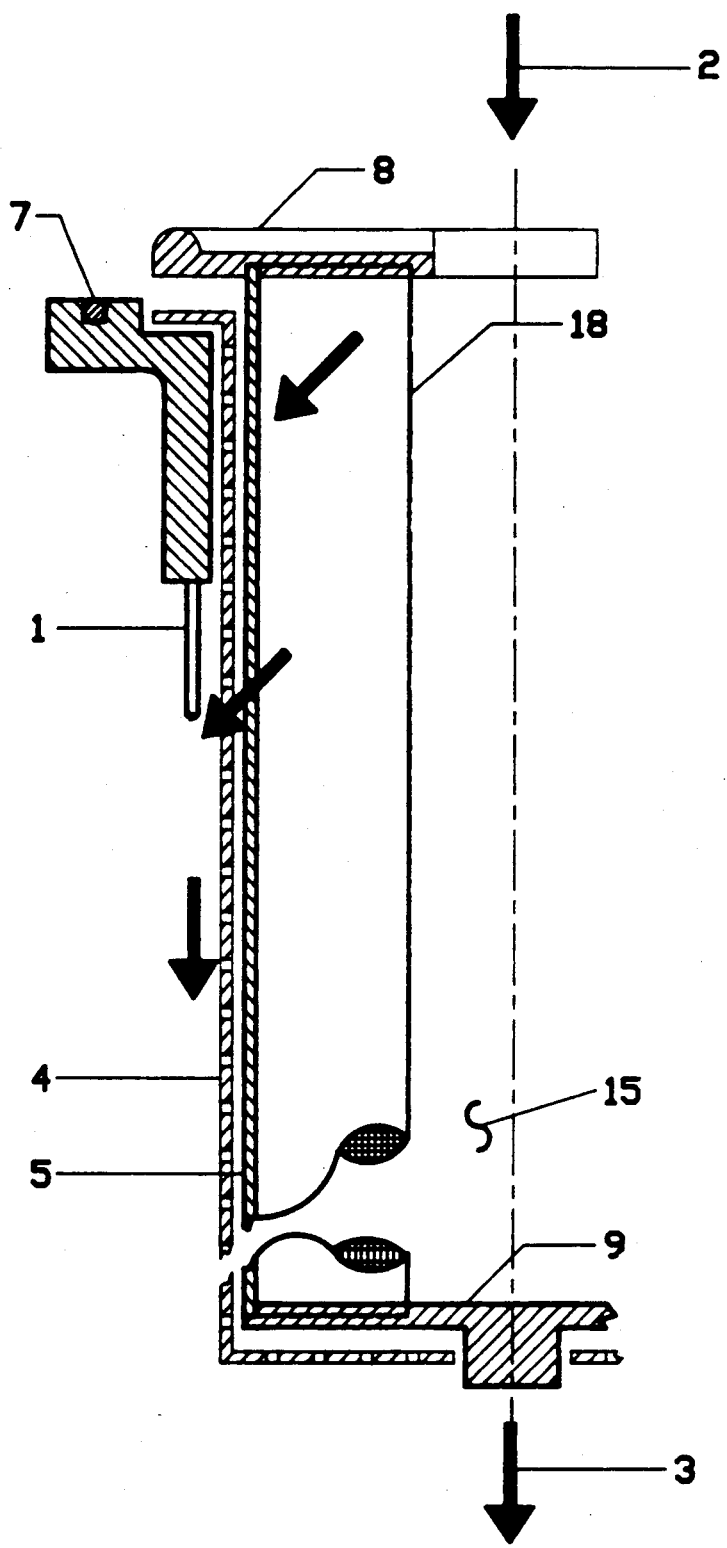
FIG. 2: Enlarged vertical section of the semi-rigid enhanced area filter element with retaining basket.

In FIG. 1 and FIG. 2 the semi-rigid enhanced area filter element (5) (hereafter referred to as "the element") is shown in place within a typical bag-type filter housing (1) and its cover (6). FIG. 2 is a vertical cross-section of the same arrangement of element (5) within housing (1) but enlarged to show more clearly the interrelationship of the element (5), the retaining basket (4) and the filter flanged housing (1).

The particular type of bag filter housing (5), retaining basket (4), and cover (6) depicted in FIG. 1 and FIG. 2 is selected for simplicity of purpose and is not meant to preclude adaptability of the element (5) to other configurations and types of filter housings.

In this invention, the element (5) has an overall outer configuration (envelope) of a typical bag filter and thereby provides the same preferred ease of operation during installation and withdrawal. However, the element (5) as depicted in this invention has a semi-rigid pleated and padded construction making its operation and use even more versatile.

Figure 3:
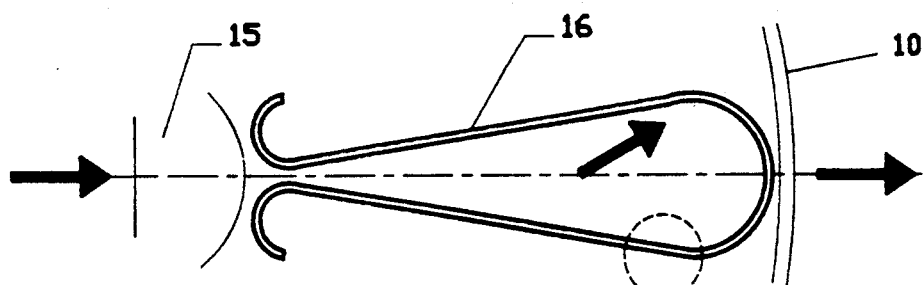
FIG. 3: Cross section of the semi-rigid enhanced area filter element showing a pleated configuration and its multiple layer construction.
Figure 4:
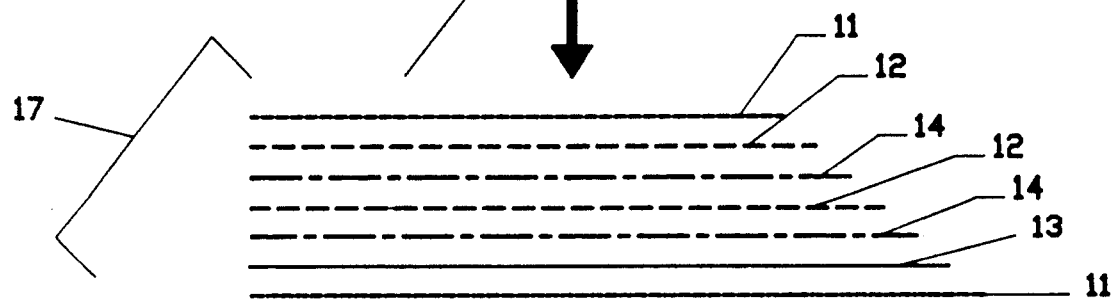
FIG. 4: Development detail of one type of multi-layered pack prior to the pleating operation.

The design of the element (5) is such as to produce the desired inside-out flow pattern; i.e., the inlet flow (2) is directed into the inner area (15), then through the various layers of coarse separators (11), filtering membranes (12 and 13) and drainage layers (14) as indicated in FIGS. 3, and 4 outward through the retaining basket (4) and down to the outlet (3).

The element (5) is specifically designed to be a semi-rigid structure in order to simplify construction and to avoid unnecessary materials to provide structural strength for the normal differential pressures developed. The element (5) depends upon the close fit and inherant strength of the retaining basket (4) to provide the outward pressure restriction necessary to sustain the developed differential pressures during filtration. The seal is provided at the top by means of a resilient flanged open-ended end cap (8). The seal at the bottom of the element is provided by means of a solid bottom end cap (9). Both parts (8) and (9) can be cast or potted.

Figure 5:
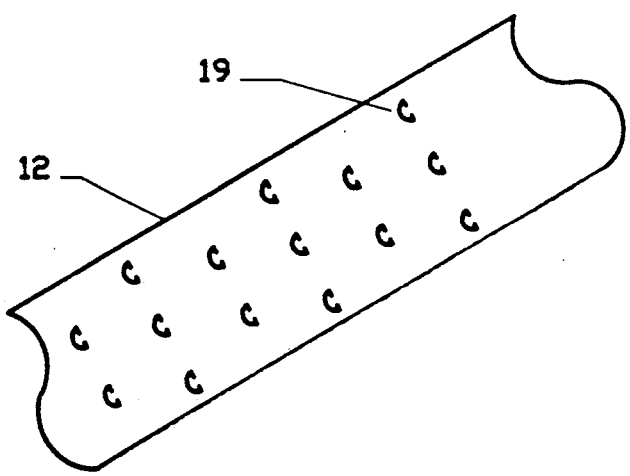
FIG. 5: Detail of one preferred embodiment of a padded layer with cresent shaped slots (or slits).

Furthermore the element (5) is designed to provide several fold increases in finite filtering surface as compared with conventional bag filters or pleated cartridges within the same general envelope. This is accomplished by using a vertical pleated format in conjunction with padded layers of inner filtering membranes and separators. FIG. 3 shows the cross-section of the pleats (16) and the multiple layers of the coarse separator (11), padded layers of filtering membranes (12), drainage layers (14), one or two final filtering membranes (13), and, an outer separator layer (11) all of which can be peripherally retained by an outer support (10). The entire pleated stack (18) is bonded to a resilient bottom end cap (9) and to a resilient open-ended flanged upper end cap (8) as shown in FIG. 2. FIG. 4 shows an example of a layer pack (17) using slotted pads (12). The padded layers (12) are not necessarily integrally bonded at the upper and bottom edges. In fact, these layers are more typically merely pads or strips of the same filtering media as the integral layers (13) but provide a means of filtering out a portion of the particulate but allowing the main stream to continually or eventually by-pass to the next following layer as each padded layer become plugged. This technique is similar to the "stacked" arrangements utilized in flat disc filter holders wherein for example a series of 257 mm diameter and 293 mm diameter discs are alternated in padded pack. An example of the increase in filtering area that can be achieved with semi-rigid enhanced area element is presented by comparing a typical 7 inch diameter by 30 inch long bag filter as a normal cylinder of 4.5 square feet of filter surface. A similar sized cylinder but with its outer surface constructed in the form of sixty two inch deep vertical pleats will provide up to 45 square feet of filter surface. However, as in this invention, if the 45 square feet of pleated surface are additionally augmented by two or more padded layers (12) of approximately the same porosity membrane, the final effective filtering surface area will be increased by at least another 35 square feet for each padded layer (12) pleated into the pack or a total of 120 square feet for a double padded pack and 150 square feet for a triple padded pack. Obviously, the increase in total effective filtering area is a function of the configuration by which the padded layers are sandwiche within the pleats. In the example shown in FIG. 4, the padded layers (12) are merely narrow strips of membrane layed down in a longitudinal pattern with a nominal spacing between strips. This arrangement provides approximately 75% area coverage or 35 square feet of additional filtering surface per layer of padding in the 7 inch×30 inch example above. However, please note that the strip padded layer method is but one example for the incorporation of padded layers. Continous one piece pads with controlling slits (19) as shown in FIG. 5, is yet another preferred example of a novel method for increasing effecative areas within padded arrangements. Specifically, with slitted continous pads, the slits (19) act as valves and prevent flow through the slits until after a sufficient increase in pressure is developed across the pad and then allow by-passing through to the next series of pads. This, of course, is essentially comparable to having 2 or 3 filters in parallel and in series at the same time. These examples are not to preclude other methods for manufacture. In general, regardless of the specific shape and surface continuity of the padded layers incorporated, a 30 to 40 times increase in filtering area over that of a typical bag filter can be obtained with this type pleated and padded construction.

I claim:

1. A semi-rigid, enhanced area, and one piece disposable filter element that is to be closely fitted within a rigid nondisposable outer perforated retaining basket within a filter vessel comprised of an inlet cover and an outlet chamber which retains the basket on an internal ridge for separation of solids from liquids by providing inside to outside flow passage through multiple internal layers of padded filtering membranes alternately separated by layers of drainage media, said padded membranes to be provided with by-pass slits which function as self-regulating valves for progressive filtration through each succeeding layer up to a final integral layer of membrane containing no by-pass slits, and with all layers pleated vertically into a cylindrical shape and bonded together at the bottom with a solid resilient end cap and at the top with a flanged resilient open-ended end cap of which the flange does provide a sealing lip to isolate the inlet and outlet chambers of a filter housing by compression between the filter cover and the outlet chamber inner ridge.

2. A filter element according to claim 1 wherein said padded and pleated layers are adsorbant and separating type membranes.

3. A filter element according to claim 1 wherein said semi-rigid construction provides for secondary support through the strength of a closely fitted outer perforated basket integrally bounded to the top and bottom end caps.

* * * * *